United States Patent
Van Mechelen et al.

(10) Patent No.: US 12,297,154 B2
(45) Date of Patent: May 13, 2025

(54) METHOD FOR PRODUCING A CARBONATE BONDED, COMPACTED ARTICLE

(71) Applicant: Orbix Productions, Genk (BE)

(72) Inventors: Dirk Van Mechelen, Tisselt (BE); Peter Van Mierloo, Beerse (BE); Nick Mayelle, Nerem-Tongeren (BE)

(73) Assignee: ORBIX PRODUCTIONS, Genk (BE)

( * ) Notice: Subject to any disclaimer, the term of this patent is extended or adjusted under 35 U.S.C. 154(b) by 807 days.

(21) Appl. No.: 17/621,313

(22) PCT Filed: Jun. 26, 2020

(86) PCT No.: PCT/EP2020/068002
§ 371 (c)(1),
(2) Date: Dec. 21, 2021

(87) PCT Pub. No.: WO2020/260568
PCT Pub. Date: Dec. 30, 2020

(65) Prior Publication Data
US 2022/0332654 A1    Oct. 20, 2022

(30) Foreign Application Priority Data
Jun. 26, 2019  (EP) .................................. 19182726

(51) Int. Cl.
*C04B 40/02*   (2006.01)
*C04B 7/147*   (2006.01)

(52) U.S. Cl.
CPC .......... *C04B 40/0231* (2013.01); *C04B 7/147* (2013.01)

(58) Field of Classification Search
CPC ................................................. C04B 40/0231
See application file for complete search history.

(56) References Cited

U.S. PATENT DOCUMENTS 10,598,573 B2 *   3/2020   Mayelle ................ C04B 28/082

OTHER PUBLICATIONS

International Search Report issued in corresponding International Patent Application No. PCT/EP2020/068002 dated Nov. 11, 2020.
Zhan et al., "Effect of curing parameters on CO2curing of concrete blocks containing recycled aggregates," Cement and Concrete Composites, 71: 122-130 (2016).

* cited by examiner

*Primary Examiner* — Stuart L Hendrickson
(74) *Attorney, Agent, or Firm* — Morgan, Lewis & Bockius LLP

(57) ABSTRACT

The method for producing a carbonate bonded, compacted article, which method comprises the steps of providing a particulate, carbonatable material; compacting the particulate material to form a compact; and carbonating said compact. The carbonation of the compact is started and subsequently continued for at least 1 hour with a low partial carbon dioxide pressure in the carbonation gas which is lower than 0.5 bars, after which carbonation of the compact is continued for at least 8 hours with a high partial carbon dioxide pressure in the carbonation gas which is higher than 0.5 bars. By carbonating in two phases with a low and a high partial carbon dioxide pressure, a higher compressive strength of the carbonated compacts can be achieved within a predetermined carbonation time, in particular within a carbonation time of about 24 hours so that every day new compacts can be carbonated.

15 Claims, No Drawings

METHOD FOR PRODUCING A CARBONATE BONDED, COMPACTED ARTICLE

The present invention relates to a method for producing a carbonate bonded, compacted article, which method comprises the steps of providing a particulate, carbonatable material; compacting the particulate material to form a compact; and carbonating said compact for a predetermined period of time with a gas which contains carbon dioxide to produce carbonates thus transforming the compact into said carbonate bonded, compacted article.

There are different industrial production processes which produce carbonatable materials as by-products. These by-products are for example fly ashes, bottom ashes (in particular municipal waste incineration bottom ashes) and slags generated during the production of phosphorus or during the production of ferrous or non-ferrous metals, such as zinc, copper and lead and iron or steel. Also dust from air filters for example from steel furnaces is carbonatable in particular when it contain calcium oxides. Some of these by-products can be used in different applications. Blast furnace slags can be used for example in road construction and also in the production of cement. Some slags, such as common steel slags (for example LD slags) which have a high neutralizing value can for example also be used as a soil conditioning agent. Other materials, such as bottom ashes and stainless steel slags contain however considerable amounts of heavy metals which are problematic in view of their leaching behaviour.

In order to limit the impact, both economic and environmental, of these domestic and industrial waste materials, attempts have been made more and more to develop methods of processing these materials, i.e. methods for converting these waste materials into economically valuable materials. A large quantity of these waste materials is alkaline and comprises carbonatable substances, such as calcium oxides and/or hydroxides and magnesium oxides and/or hydroxides. Other substances, for example calcium silicates contained in the waste materials, may also be carbonatable. It is known that the carbonation of these substances, makes it possible to obtain materials having good mechanical qualities. Moreover, carbonation may also help in preventing leaching of pollutants such as heavy metals.

It has for example been proposed, in WO-A-2007/096671, to proceed with an accelerated carbonation of waste in a rotary drum in order to produce a secondary granulate that can serve as a construction material. A similar process has been proposed for waste from the extraction or processing of metals in WO-A-2009/024826. In the materials obtained by these processes, the carbonation of lime, present in the waste, forms a calcareous matrix ensuring both less leaching of the heavy metals contained in the waste, and greater mechanical strength.

Stainless steel slags are a particular group of slags which contain relatively large amounts of chromium and often also of nickel and/or of molybdenum. As disclosed in EP-B-0837043, EP-B-1055647 and in EP-B-1146022 the leaching problems of stainless steel slags can be solved by crushing the steel slags, removing the valuable stainless steel particles therefrom and by applying the different fractions of the remaining crushed slags in bounded applications, for example as fine or coarse aggregate in concrete or asphalt. However, due to its higher gamma dicalcium silicate ($\gamma$-C2S) content, the finer fraction of these crushed steel slags (0-0.5 mm) has high water absorption properties and is thus not suited for being used in concrete or asphalt applications.

To reduce the high water absorption of the fines removed from coarser fractions of crushed stainless steel slag so that not only these coarser fractions but also the fines can be used in concrete or asphalt, WO 2009/090219 proposes to aggregate and subsequently carbonate these fines under a relatively low pressure. In this way, aggregates having lower water absorption properties and the necessary strength for being used in concrete or asphalt could be produced.

Another carbonation method for producing more valuable construction materials starting from particulate carbonatable materials, in particular from the fines of crushed stainless steel slags which have a size of between 0 and 0.5 mm, is disclosed in WO-A-2009/133120. In this method the particulate material is first compacted with a relatively high compaction pressure of between 5 and 65 MPa, and the obtained compact is subsequently carbonated under a relatively high temperature and pressure. In this way, carbonated compacts with a relatively high compressive strength can be produced. By controlling the porosity and the intrinsic permeability of the compacts, and by carbonating for several hours (more particularly for 18 hours at an increased pressure and temperature), compressive strengths of between 26 and 66 MPa were obtained with a 0-500 μm fine stainless steel slag fraction which was compacted with a compaction pressure of 182 kg/cm$^2$ (=17.8 MPa). A drawback of this prior art method is that, notwithstanding the fact that relatively small blocks were carbonated (62×62×32 mm and 120×55×46 mm), high gas pressures were required, namely pressures higher than 5 bars, which makes the process quite costly.

US 2017/0073270 discloses a carbonation method wherein carbonate bonded construction blocks are produced starting from a mixture of slag sand and a steel slag binder. In the example "Sample Building Product 1" the steel slag binder is a mixture of EAF slag and BOF slag which has a quite high basicity (39.08 wt. % CaO versus 12.47 wt. % $SiO_2$) so that the steel slag binder comprises a quite large amount of free lime which can readily react with carbon dioxide to produce the required carbonates. The mixture contained about 62 wt. % of the steel slag binder and about 38 wt. % of the slag sand. The mixture was compacted first with a high compaction pressure of 12 MPa, after which the compact was dried and carbonated for 24 hours with carbon dioxide which was kept at a constant pressure of 1.5 bars. Prior to entering the carbonation chamber, the carbon dioxide gas was heated to 22° C.

After the carbonation step, the carbonated block was further allowed to hydrate for 35 days to increase the compressive strength thereof. Notwithstanding the high compaction pressure, the large amount of binder, the quite long carbonation time and the relatively large amount of carbonates that were produced (6.6% $CO_2$ uptake), the compressive strength only comprised 22.8 MPa.

An object of the present invention is now to provide a new method for producing carbonate bonded, compacted articles which enables to obtain higher compressive strengths of the compacted and carbonated compacts within a predetermined carbonation time, in particular within a carbonation time of about 24 hours so that every day new compacts can be carbonated.

To this end the method of the present invention is characterised in that carbonation of said compact is started and subsequently continued for at least 1 hour with a low partial carbon dioxide pressure in said gas, after which carbonation of said compact is continued for at least 8 hours with a high partial carbon dioxide pressure in said gas, said low partial carbon dioxide pressure being lower than 0.5 bars and said high partial carbon dioxide pressure being equal to or higher than 0.5 bars.

The partial carbon dioxide pressure is defined as the partial pressure of the carbon dioxide in the gas used to carbonate the compact. In case this gas consists entirely of carbon dioxide, the partial pressure of the carbon dioxide is equal to the total pressure of this gas. In practice, the gas will however usually be a mixture of gasses. In particular the gas may consist of air enriched with carbon dioxide. The partial carbon dioxide pressure in such a gas is then determined by the total pressure of this gas and the volume percent of carbon dioxide contained in this gas. The indicated pressures are absolute pressures.

The present inventors have found that by first carbonating with a low partial carbon dioxide pressure and subsequently with a higher partial carbon dioxide pressure higher compressive strengths can be achieved within a same period of time, in particular within a carbonation time of 24 hours. Higher partial carbon dioxide pressures, i.e. higher concentrations of carbon dioxide in the carbonation chamber and/or higher gas pressures in the carbonation chamber, are known to accelerate the carbonation process and thus to produce more carbonates. As illustrated for example in FIG. 7 of EP 2 276 714 B, higher carbonate contents are moreover correlated with higher compressive strengths of the carbonated articles. In accordance with the present invention, carbonating the compacts initially with a lower partial carbon dioxide pressure and subsequently with a higher partial carbon dioxide pressure surprisingly resulted in a higher compressive strengths of the carbonated articles. Experiments have for example shown that fine stainless steel slag binders, having a particle size of between 0 and 500 μm and water contents varying from 5 to 11%, enabled to produce carbonated articles having compressive strengths between 46 and 54 MPa, by compacting the slag binders under a relatively small pressure of 4 MPa, and carbonating the compacts initially for 2 hours with a partial carbon dioxide pressure of 0.4 bars (40 vol. % $CO_2$ at atmospheric pressure) and subsequently for 18 hours with a partial carbon dioxide pressure of 0.8 bars (80 vol. % $CO_2$ at atmospheric pressure), which is considerably higher than the above described compressive strength of about 22 MPa obtained in US 2017/0073270.

In an embodiment of the method according to the present invention, subsequently to having started the carbonation of said compact, the carbonation thereof is continued for at least 1.5 hours with said low partial carbon dioxide pressure in said gas. In a further embodiment of the method according to the present invention, subsequently to having started the carbonation of said compact, the carbonation thereof is continued for less than 16 hours, preferably for less than 12 hours and more preferably for less than 8 hours, with said low partial carbon dioxide pressure in said gas. Carbonation of the compact with the low partial carbon dioxide pressure in said gas is therefore preferably carried out, subsequently to having started the carbonation, for 1 to 16 hours, preferably for 1.5 to 12 hours, more preferably for 1.5 to 8 hours and most preferably for 1.5 to 6 hours.

An advantage of these embodiments is that the strength of the carbonated compacts is improved whilst sufficient time of the carbonation period remains to produce more carbonates with the gas having a high partial carbon dioxide pressure.

In an embodiment of the method according to the present invention, carbonation of said compact is continued therefore for at least 12 hours, preferably for at least 16 hours, with said high partial carbon dioxide pressure in said gas.

In an embodiment of the method according to the present invention, said gas having said low partial carbon dioxide pressure is at a pressure which is lower than 5 bars, preferably lower than 3 bars, more preferably lower than 2 bars and most preferably lower than 1.5 bars, said pressure being preferably equal to or higher than the atmospheric pressure. In an embodiment of the method according to the present invention, said gas having said high partial carbon dioxide pressure is at a pressure which is lower than 5 bars, preferably lower than 3 bars and more preferably lower than 2 bars, said pressure being preferably equal to or higher than the atmospheric pressure.

In the present specification gas pressures, or partial gas pressures, are absolute pressures. The relatively low pressures indicated in these embodiments are advantageous in that the carbonation can be carried out in a climate chamber which does not have to resist high pressures, and wherein preferably no partial vacuum has to be created. Large productions are thus possible without too high investments in the required carbonation installations.

In an embodiment of the method according to the present invention, said low partial carbon dioxide pressure is lower than 0.45 bars.

The lower the partial carbon dioxide pressure the lower the carbonation rate. According to the present invention it has been found that when initially carbonating the compacts at a lower carbonation rate, stronger carbonated articles can be obtained.

In an embodiment of the method according to the present invention, said low partial carbon dioxide pressure is higher than 0.05 bars, preferably higher than 0.1 bar and more preferably higher than 0.15 bars.

An advantage of this embodiment is that by using such partial carbon dioxide pressures during the initial phase of the carbonation step, a high compressive strength can be achieved whilst enabling to reduce the required duration of the initial low pressure carbonation phase.

In an embodiment of the method according to the present invention, said high partial carbon dioxide pressure is higher than 0.6 bars, preferably higher than 0.7 bars and more preferably higher than 0.75 bars.

An advantage of this embodiment is that the higher the partial carbon dioxide pressure in the gas during the second phase of the carbonation step, the more quickly the carbonates are produced and the required compressive strength is achieved. In other words, the duration of the carbonation step can thus be reduced or higher compressive strengths can be achieved within a same carbonation period.

In an embodiment of the method according to the present invention, the predetermined period of time during which the compact is carbonated comprises less than 32 hours, in particular less than 28 hours and more in particular 24 hours or less.

With such short carbonation periods, a high production capacity can be achieved. In particular, it is possible to produce every day a new load of carbonated articles without having to arrange night shift work.

In an embodiment of the method according to the present invention, the predetermined period of time during which the compact is carbonated comprises more than 16 hours, in particular more than 18 hours and more in particular more than 20 hours.

Such carbonation periods enable to achieve relatively high compressive strengths when carbonating the compacts in accordance with the present invention, i.e. with a low partial carbon dioxide pressure followed by a high partial carbon dioxide pressure.

In an embodiment of the method according to the present invention, carbonation of said compact is started with said gas having a temperature lower than 50° C., preferably lower than 45° C. and more preferably lower than 40° C.

The advantage of such lower initial temperatures is that the carbonation rate is also lower and higher compressive strengths can be achieved.

In an embodiment of the method according to the present invention, carbonation of said compact is started with said gas having a temperature higher than 20° C., preferably higher than 25° C. and more preferably higher than 35° C.

By using such higher temperatures, carbonation of the compact starts more quickly thus enabling to obtain a sufficiently high compressive strength within a shorter period of time.

In an embodiment of the method according to the present invention, during the carbonation of said compact the temperature of said gas is increased to a temperature higher than 50° C., preferably higher than 55° C. and more preferably higher than 60° C. Preferably, the temperature of said gas is kept below 95° C., more preferably below 90° C.

Due to the exothermic hydration/carbonation reaction, the temperature will automatically rise during the carbonation process. The higher temperatures, in particular during the second phase of the carbonation step, will further accelerate the carbonation process without having however a negative effect on the compressive strength that can be achieved.

In an embodiment of the method according to the present invention the particulate material comprises carbonatable slag from a metal production process, slag from the production of phosphorus, bottom ash and/or fly ash, the particulate material preferably comprises steel slag, in particular stainless steel slag.

In an embodiment of the method according to the present invention the particulate material which is compacted to form said compact has a water content of at least 1%, preferably at least 3% and more preferably at least 5% by dry weight.

A minimum amount of water is required for the carbonation step, in particular at least 1% by dry weight, whilst higher water contents are advantageous to achieve higher green strengths of the compact.

Other particularities and advantages of the invention will become apparent from the following more detailed description of some particular embodiments.

The present invention generally relates to a method for producing a carbonate bonded, compacted article by compacting and carbonating a particulate, carbonatable material.

The expression "particulate material", or also "granular material", refers to any material which consists of loose particles. These particles may be of different sizes so that the expression "particulate material" not only embraces coarse or fine granulates but also very fine granulates, in particular powders.

The particulate material may consist of one particulate material which is carbonatable or it may consist of a mixture of at least one first particulate material, which is carbonatable, and at least one second particulate material which may be carbonatable or not. A particulate material which is not carbonatable comprises for example natural sand, such as sea sand or river sand.

The granulometry of the particulate material, or of the mixture of the first and second particulate materials, is preferably selected to achieve a higher packing density, or in other words a smaller total porosity, since in this way a higher compressive strength can be obtained. The compressive strength of the compact before the carbonation step, i.e. the green strength of the compact, as well as the compressive strength of the carbonated compact is determined in accordance with the European standard EN 12390-3:2009.

The particulate material which is carbonatable, i.e. the carbonatable material as a whole or, in case of the above described mixtures of first and second particular material, the first particulate material and/or the second particulate material when it is carbonatable, comprises preferably a by-product or a waste product. The particulate material which is carbonatable has in particular a pH of at least 8.3 and comprises a source of at least one alkaline earth metal, in particular calcium. The pH of the carbonatable material is defined as the pH of demineralised water wherein the particulate material has been immersed for 18 hours in a liquid/solid ratio of 4.5. The carbonatable material may contain different crystalline and amorphous phases and preferably contains at least one alkaline earth metal silicate phase, in particular crystalline dicalcium silicate.

The particulate material which is carbonatable also preferably comprises calcium oxide and/or calcium hydroxide, the total amount of calcium oxide and calcium hydroxide being preferably at least 1% by dry weight, more preferably at least 2% by dry weight. It may also contain magnesium oxide and/or magnesium hydroxide. These oxides and hydroxides may be in an amorphous and/or in a crystalline form, in particular in the form of portlandite ($Ca(OH)_2$), free lime (CaO), brucite ($Mg(OH)_2$) and in the form of periclase (MgO). The may also be present in amorphous or crystalline forms comprising magnesium and calcium, in varying ratios, and oxygen. Initially, as they are often produced under high temperatures, the freshly produced carbonatable materials usually contain no hydroxides but only oxides, the hydroxides being formed upon aging (weathering) of the carbonatable material or during the carbonation step. As the air also contains a small amount of carbon dioxide, upon aging of the carbonatable material a portion of the hydroxides is further transformed into carbonates (by natural carbonation).

A wide variety of carbonatable materials is suitable for being processed in accordance with the method according to the present invention. Suitable carbonatable materials are for example bottom ashes, more particularly bottom ashes produced during the incineration of waste, in particular of municipal waste (i.e. municipal waste incineration bottom ashes). Also fly ashes can be carbonated, in particular non-coal fly ashes and moreover filter dust from a steel furnace, in particular from an electric arc furnace (EAF filter dust). Most preferred carbonatable materials are however slag materials resulting from metal production processes (production of pig iron, steel, stainless steel and production of non-ferrous metals such as copper and zinc) and from the production of phosphorus. The used carbonatable material is preferably a non-hydraulic, or substantially non-hydraulic material. Since a non-hydraulic material cannot provide as such a settable matrix by reaction with water (in particular by CSH formation), a solid article can still be produced by carbonation of this material.

The slag material may be a blast furnace slag but it is preferably a steel making slag, more preferably a stainless steel making slag. Steel making slags may be converter slags (such as LD slags) or electric arc furnace slags (EAF slags). Common steel making slags do not contain or only small amounts of heavy metals such as chromium and nickel and therefore do not present leaching problems as stainless steel slags do. Stainless steel slags generally contain more than 3000 mg/kg chromium and usually even more than 5000 mg/kg chromium. They may also contain nickel, more particularly more than 300 mg/kg, in particular more than 400 mg/kg and often even more than 500 mg/kg nickel. By carbonating these carbonatable slags, leaching of these heavy metals can be reduced or even prevented.

Steel slags, and in particular stainless steel slags, are usually crushed to produce a granular material from which the metal fraction can be recycled. The coarser fraction of the crushed stainless steel slag can be used as coarse or fine aggregate in concrete of asphalt. The finer fraction, in particular the 0-500 μm fraction, has however too high water absorption properties so that it is not suitable, as such, for these applications. The finer fraction, i.e. the so-called fines, contains indeed a larger amount of gamma dicalcium silicate ($\gamma$-C2S) which is produced during the solidification of the liquid slag when a portion of the beta dicalcium silicates ($\beta$-C2S) is further transformed in the gamma polymorph. Due to the resulting expansion, cracks are formed and a so-called falling slag is produced which has high water absorption properties. This stainless steel slag material, which contains in particular at least 3% by dry weight, more particularly at least 5% by dry weight and even more particularly at least 7% by dry weight of $\gamma$-C2S is preferably used as particulate material, or as one of the particulate materials, in the method of the present invention.

In the method of the present invention, the particulate, carbonatable material is first compacted to produce compacts. This can be done by applying the material in a mould and vibrating or compressing the material therein. After having compacted the carbonatable material, the produced compact is carbonated by means of a gas which contains carbon dioxide thereby producing carbonates which transform the compact in the carbonate bonded, compacted article.

The compacts are removed from the mould and they are placed in a carbonation chamber. This chamber may be an autoclave wherein relatively high gas pressures are applied. In the method according to the present invention the carbonation step is however preferably carried out with lower gas pressures, in particular with total gas pressures lower than 5 bars, preferably lower than 3 bars, more preferably lower than 2 bars and most preferably lower than 1.5 bars. The carbonation step can in particular be carried out at atmospheric pressure. A less expensive climate chamber can thus be used as carbonation chamber.

The compacts are preferably carbonated for 16 to 32 hours, more preferably for 18 to 28 hours and most preferably for 20 to 24 hours. In practice, a total carbonation time of at most 24 hours is preferred so that each day a new load of compacts can be carbonated.

The compressive strength of the carbonated compacts depends on a number of factors such as the nature and the granulometry of the particulate material, the compaction degree thereof (i.e. the porosity) and the amount of carbonates produced therein by the carbonation reaction. Within a same period of time, more carbonates can be produced with higher temperatures and with higher partial carbon dioxide pressures.

However, in accordance with the present invention, it has been found that within a predetermined carbonation period higher compressive strengths can be achieved not by producing as much as possible carbonates but by first carbonating the compact, during an initial phase of the carbonation step, more slowly with a lower partial carbon dioxide pressure in the carbonation chamber and by subsequently carbonating the compact, during the next phase of the carbonation step, more quickly with a higher partial carbon dioxide pressure.

In the method according to the present invention, the carbonation of the compacts is started and the carbonation of the compacts is subsequently continued for at least 1 hour with a low partial carbon dioxide pressure in the carbonation chamber and is thereafter continued for at least 8 hours with a high partial carbon dioxide pressure in the carbonation chamber. The low partial carbon dioxide pressure is lower than 0.5 bars whilst the high partial carbon dioxide pressure is equal to or higher than 0.5 bars.

The carbonation of the compacts is started as from the moment the compacts are brought in contact with a gas, in a carbonation chamber, which has a higher carbon dioxide content than the surrounding air. The subsequent phase of the carbonation step then starts when the compacts are in contact with the gas which provides the low partial carbon dioxide pressure in the carbonation chamber. Usually, the compacts are first put in the carbonation chamber after the partial carbon dioxide pressure is provided therein, in particular by feeding carbon dioxide gas in the carbonation chamber. During the carbonation phase with the low carbon dioxide partial pressure, the carbon dioxide content or corresponding partial pressure can be monitored and additional carbon dioxide can be fed into the carbonation chamber to maintain the carbon dioxide partial pressure within the required range. Since carbon dioxide is consumed during the carbonation step, it should normally be replenished in the carbonation chamber. To start the carbonation phase with the high carbon dioxide partial pressure, additional carbon dioxide can be fed into the carbonation chamber to increase the partial carbon dioxide pressure therein.

In the above described embodiment, the pressure within the carbonation chamber can be kept constant and the partial carbon dioxide pressure is modified by changing the carbon dioxide content in the gas contained in the carbonation chamber.

The gas in the carbonation chamber can also be recycled over a first container, which contains a gas having a low carbon dioxide content, and subsequently over a second container, which contains a gas having a higher carbon dioxide content. In this way, loss of carbon dioxide into the atmosphere can be avoided or reduced when opening the carbonation chamber to remove the carbonated compacts therefrom. Alternatively, at the end of the carbonation step, the carbon dioxide content in the carbonation chamber can first be allowed to drop before removing the carbonated compacts therefrom.

The gas having the low carbon dioxide content may be a flue gas. If at atmospheric pressure the partial carbon dioxide pressure in that flue gas is not high enough for the first phase of the carbonation step, the pressure of the flue gas may be increased. If a partial carbon dioxide pressure of 0.4 bars is required, and the flue gas contains 20 vol. % of carbon dioxide, that flue gas should be brought to a pressure of about 2 bars in the carbonation chamber.

It is also possible to provide a continuous carbonation system wherein the compact are led through a first zone, wherein the low partial carbon dioxide pressure is maintained and subsequently through a second zone wherein the high partial carbon dioxide pressure is maintained. Such a system can in particular be made when the different zones are at atmospheric pressure to avoid the gas from escaping from the system.

Instead of, or in addition to, adjusting the partial carbon dioxide pressure by adjusting the carbon dioxide content of the gas used to carbonate the compacts, it is also possible to increase the pressure of that gas in case a higher partial carbon dioxide pressure is needed. In the carbonation chamber this may be obtained automatically, when the carbonation chamber is hermetically sealed, when adding additional carbon dioxide gas to raise the partial pressure thereof from said low to said high partial carbon dioxide pressure. When the first phase of the carbonation step is done at atmospheric pressure, the second phase of the carbonation step could be done at 1.5 bars by adding about 0.5 bars or carbon dioxide pressure.

The first phase of the carbonation step, i.e. the carbonation of the compacts with the low partial carbon dioxide pressure, takes at least 1 hour, and preferably at least 1.5 hours. Preferably this first phase is stopped, in particular by increasing the partial carbon dioxide pressure in the carbonation chamber, within less than 16 hours, preferably within less than 8 hours and more preferably within less than 6 hours. Afterwards, the second phase of the carbonation step, i.e. the carbonation of the compacts with the high partial carbon dioxide pressure, takes at least 8 hours, preferably at least 12 hours and more preferably at least 16 hours.

According to the invention, the low partial carbon dioxide pressure applied in the carbonation chamber during the first carbonation phase is lower than 0.5 bars, and preferably lower than 0.45 bars. Such low partial carbon dioxide pressures provide a relatively slow carbonation of the compacts, which was found to produce carbonates that give more strength to the carbonated compacts, even when in the next carbonation phase the carbonation was accelerated by providing a higher partial carbon dioxide pressure in the carbonation chamber.

To produce the required strength increasing carbonates during the first phase of the carbonation step, the low partial carbon dioxide pressure provided during that first carbonation phase in the carbonation chamber is preferably higher than 0.05 bars, more preferably higher than 0.1 bar and most preferably higher than 0.15 bars. The low partial carbonation pressure is thus preferably comprised between 0.05 and 0.5 bars, preferably between 0.1 and 0.45 bar and most preferably between 0.15 and 0.4 bars.

To produce the required amount of carbonates during the second phase of the carbonation step, the high partial carbon dioxide pressure provided during that second carbonation phase in the carbonation chamber is higher than 0.5 bars, preferably higher than 0.6 bars, more preferably higher than 0.7 bars and most preferably higher than 0.75 bars. The high partial carbonation pressure is preferably lower than 5 bars, more preferably lower than 3 bars, even more preferably lower than 2 bars and most preferably lower than 1.5 bars. The high partial carbonation pressure is thus preferably comprised between 0.5 and 5 bars, preferably between 0.6 and 3 bars and most preferably between 0.7 and 2 bars.

The temperature of the carbonation gas has also an effect on the carbonation rate. A higher temperature accelerating the carbonation whilst a lower temperature providing a slower carbonation.

Since in the first carbonation phase the carbonation process should be sufficiently slow, the carbonation of the compacts is preferably started with a carbonation gas which is at a temperature of less than 50° C., preferably of less than 45° C. and more preferably of less than 40° C. To start the carbonation process sufficiently quickly, the carbonation of the compacts is preferably started with a carbonation gas which has a temperature higher than 20° C., preferably higher than 25° C. and more preferably higher than 35° C. During the second carbonation phase, the temperature of the carbonation gas is preferably increased, or allowed to increase, to a temperature higher than 50° C., preferably higher than 55° C. and more preferably higher than 60° C. Preferably, this temperature should remain below 95° C., or at least 10° C. below the boiling point of water at the pressure prevailing in the carbonation chamber to avoid boiling of the water contained in the compacts.

EXAMPLES

Example 1

A stainless steel slag material was crushed to a particle size of between 0 and 35 mm and was separated in a 10 to 35 mm fraction and a 0 to 10 mm fraction. The 0 to 10 mm fraction was separated in a 0 to 2 mm fraction and in a 2 to 10 mm fraction.

From the 0 to 2 mm fraction, the steel particles were removed and the fraction was separated in a coarse sand fraction of 0.5 to 2 mm and in a fine sand fraction of 0 to 0.5 mm.

The fine sand fraction was dried and the moisture content thereof (expressed in percent by total weight) was adjusted to the values indicated in Table 1. Compacts were made with a compaction pressure of 0.4 MPa using 100% of the fine sand fraction. Carbonation was carried out at atmospheric pressure, i.e. at about 1 bar absolute pressure. The gas used to carbonate the compact is a mixture of gasses obtained by enriching air with $CO_2$. The $CO_2$ content of the gas (enriched air) used to carbonate the compacts is indicated in volume percent. Since the total pressure of the gas used to carbonate the compacts is equal to the sum of the partial pressures of the different gasses contained in this gas (in this case mainly $CO_2$, $N_2$ and $O_2$), the partial carbon dioxide pressure in this gas can easily be determined and is equal to the volume percent of $CO_2$ in that gas multiplied by the total pressure of the gas. In the present examples, the total pressure of the gas used to carbonate the compacts was equal to about 1 bar, so that when this gas contained 40 vol. % of $CO_2$ (in the first carbonation phase) the partial carbon dioxide in this gas was equal to about 0.4 bar whilst when this gas contained 80 vol. % $CO_2$ (in the second carbonation phase) the partial carbon dioxide in this gas was equal to about 0.8 bar.

TABLE 1

| Carbonation parameters and resulting compressive strengths of the carbonated compact produced in Example 1 | | | | | |
|---|---|---|---|---|---|
| Moisture | First carbonation phase | | Second carbonation phase | | Compressive |
| content (wt. %) | Duration (hours) | Vol. % $CO_2$ | Duration (hours) | Vol. % $CO_2$ | strength (MPa) |
| 5.66 | 2 | 40 | 18 | 80 | 51.8 |
| 7.22 | 2 | 40 | 18 | 80 | 54.7 |
| 9.15 | 2 | 40 | 18 | 80 | 46.9 |

Due to the relatively high reactivity of the fine sand fraction, a high compressive strength was obtained after a total carbonation time of 20 hours. These compressive strengths were much higher than the compressive strength obtained in the Example "Sample Building Product 1" of US 2017/0073270. Notwithstanding the fact that in this Example also a reactive steel slag binder was used and a similar water content, whilst a much higher compaction pressure of 12 MPa was applied, which should normally lead to higher compressive strengths due to the reduced porosity, the obtained carbonated construction block only had a compressive strength of 22.8 MPa.

Example 2

In this example a same 0 to 0.5 mm fine sand fraction was used as in Example 1 together with the 0.5 to 2 mm sand fraction and a 2 to 6 mm fraction sieved out from the 2 to 10 mm fraction.

TABLE 2

Carbonation parameters and resulting compressive strengths of the carbonated compacts

|  |  | Comparative example | Example 2 |
|---|---|---|---|
| Parts 0/0.5 sand | | 50 | 50 |
| Parts 0.5/2 sand | | 35 | 50 |
| Parts 2/6 sand | | 15 | — |
| Moisture content (wt. %) | | 7.4 | 5.3 |
| Compaction pressure (MPa) | | 2 | 2 |
| First carbonation phase | Duration (hours) | 24 | 2 |
| | Vol. % $CO_2$ | 100 | 40 |
| | Total pressure (bars) | 1.5 | atmospheric |
| Second carbonation phase | Duration (hours) | — | 18 |
| | Vol. % $CO_2$ | — | 80 |
| | Total pressure (bars) | — | atmospheric |
| Compressive strength (MPa) | | 10.7 | 16.1 |

It can be seen that a higher compressive strength was obtained with the two phase carbonation process, notwithstanding the fact that in the comparative example pure $CO_2$ gas was used, at a higher pressure of 1.5 bars and for a longer duration, namely for 24 hours instead of only 20 hours.

Example 3

In this example a same 0 to 0.5 mm fine sand fraction was used as in Example 1 together with the 0.5 to 2 mm sand fraction.

TABLE 3

Carbonation parameters and resulting compressive strengths of the carbonated compacts

|  |  | Comparative example | Example 2 |
|---|---|---|---|
| Parts 0/0.5 sand | | 60 | 60 |
| Parts 0.5/2 sand | | 50 | 50 |
| Parts 2/6 sand | | — | — |
| Moisture content (wt. %) | | 9.5 | 9.6 |
| Compaction pressure (MPa) | | 4 | 4 |
| First carbonation phase | Duration (hours) | 24 | 2 |
| | Vol. % $CO_2$ | 100 | 40 |
| | Total pressure (bars) | 1.5 | atmospheric |
| Second carbonation phase | Duration (hours) | — | 20 |
| | Vol. % $CO_2$ | — | 80 |
| | Total pressure (bars) | — | atmospheric |
| Compressive strength (MPa) | | 13.8 | 19.5 |

It can be seen that a higher compressive strength was obtained with the two phase carbonation process, notwithstanding the fact that in the comparative example pure $CO_2$ gas was used, at a higher pressure of 1.5 bars and for a longer duration, namely for 24 hours instead of only 22 hours.

The invention claimed is:

1. A method for producing a carbonate bonded, compacted article, which method comprises the steps of:
   providing a particulate carbonatable material;
   compacting the particulate material to form a compact; and
   carbonating said compact for a predetermined period of time with a gas which contains carbon dioxide to produce carbonates thus transforming the compact into said carbonate bonded, compacted article,
   wherein
   carbonation of said compact is started and subsequently continued for at least 1 hour with a low partial carbon dioxide pressure in said gas, after which carbonation of said compact is continued for at least 8 hours with a high partial carbon dioxide pressure in said gas, said low partial carbon dioxide pressure being lower than 0.5 bars and said high partial carbon dioxide pressure being equal to or higher than 0.5 bars.

2. A method according to claim 1, wherein subsequently to having started the carbonation of said compact, the carbonation thereof is continued for at least 1.5 hours with said low partial carbon dioxide pressure in said gas.

3. A method according to claim 1, wherein subsequently to having started the carbonation of said compact, the carbonation of said compact is continued for less than 16 hours, with said low partial carbon dioxide pressure in said gas.

4. A method according to claim 1, wherein carbonation of said compact is continued for at least 12 hours, with said high partial carbon dioxide pressure in said gas.

5. A method according to claim 1, wherein said gas having said low partial carbon dioxide pressure is at a pressure which is lower than 5 bars, said pressure being equal to or higher than the atmospheric pressure.

6. A method according to claim 1, wherein said gas having said high partial carbon dioxide pressure is at a pressure which is lower than 5 bars, said pressure being equal to or higher than the atmospheric pressure.

7. A method according to claim 1, wherein said low partial carbon dioxide pressure is lower than 0.45 bars.

8. A method according to claim 1, wherein said low partial carbon dioxide pressure is higher than 0.05 bars.

9. A method according to claim 1, wherein said high partial carbon dioxide pressure is higher than 0.6 bars.

10. A method according to claim 1, wherein said predetermined period of time comprises less than 32 hours.

11. A method according to claim 1, wherein said predetermined period of time comprises more than 16 hours.

12. A method according to claim 1, wherein carbonation of said compact is started with said gas having a temperature lower than 50° C.

13. A method according to claim 1, wherein carbonation of said compact is started with said gas having a temperature higher than 20° C.

14. A method according to claim 1, wherein during the carbonation of said compact the temperature of said gas is increased to a temperature higher than 50° C.

15. A method according to claim 1, wherein said particulate material comprises carbonatable slag from a metal production process, slag from the production of phosphorus, bottom ash and/or fly ash, the particulate material comprises steel slag.

* * * * *